W. H. HALL.
STRAW-CUTTER.

No. 181,841. Patented Sept. 5, 1876.

Witnesses
J. S. Byers
H. C. Heppel

Inventor
William H. Hall
Per A. H. Byers
Atty.

UNITED STATES PATENT OFFICE.

WILLIAM H. HALL, OF TIFFIN, OHIO.

IMPROVEMENT IN STRAW-CUTTERS.

Specification forming part of Letters Patent No. 181,841, dated September 5, 1876; application filed June 6, 1876.

*To all whom it may concern:*

Be it known that I, WILLIAM H. HALL, of Tiffin, in the county of Seneca and State of Ohio, have invented new and useful Improvements in Feed-Cutters, which improvements are fully set forth in the following specification, reference being had to the accompanying drawings.

Figure 1:
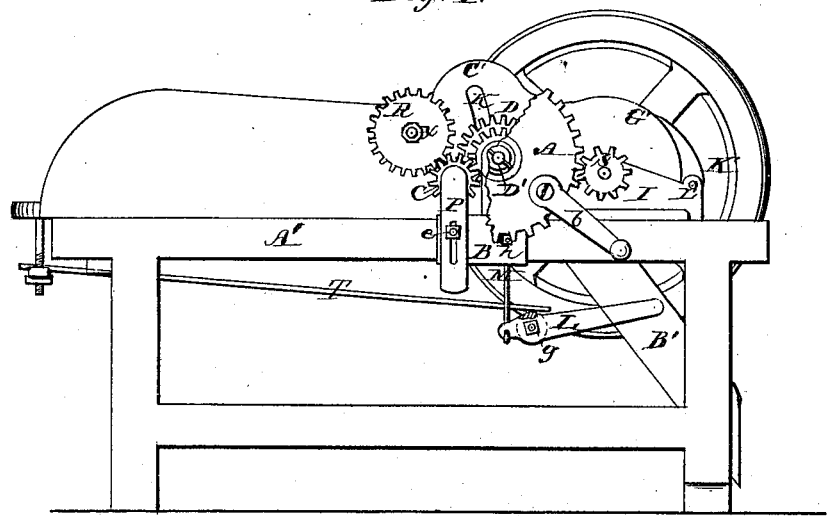
Figure 2:
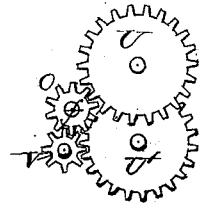
Figure 4:
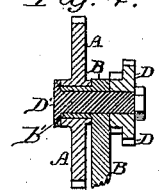
Figure 3:
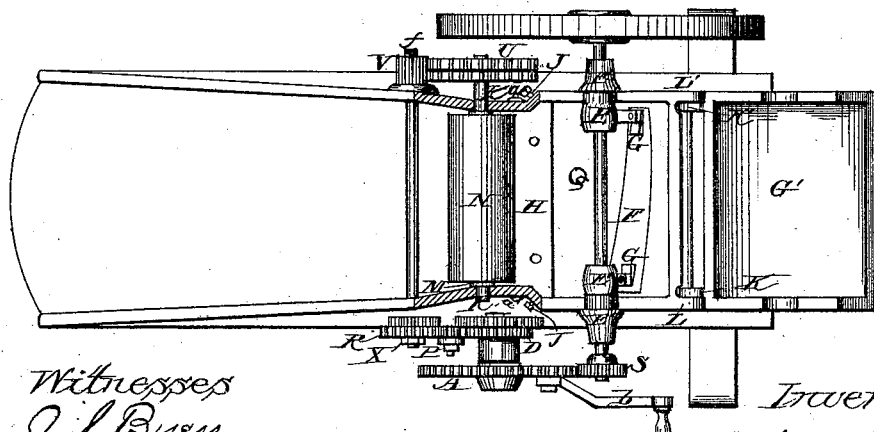

Figure 1 represents a side view of my feed-cutter, giving a full view of the feed-gearing. Fig. 2 represents a view of the gearing on the opposite side of the box. Fig. 3 represents a view looking down upon the machinery, the covers being removed. Fig. 4 shows a sectional view of bracket B and hollow arm $b'$.

A' represents the frame-work supporting the various working parts of the apparatus, provided with the usual discharge-spout B'. I represents the frame which supports the main shaft Q, and is secured to the top of the frame-work or table A'. C' represents the main frame of the apparatus, also secured to the frame A', just in rear of frame I, and is firmly secured to it by screw-bolts $a\ a$. The frames I and C' may be cast in one piece. B represents a bracket, firmly secured to frame A' by screw-bolts $h$ and $e$. This bracket has a hollow arm, $b'$, at its apex, extending outward from the feed-box, through which the short shaft D' passes. The hole in the center of wheel A fits snugly over the hollow arm $b$ on bracket B, giving it a bearing. Shaft D' extends a little beyond wheel A and its bearing, and has a lug, pin, or head, which engages with the hub of wheel A, giving motion to shaft D' when the wheel is turned. Wheel A is provided with a crank, $b$. The double wheel or pinion D has its bearing on the inner end of shaft D', which passes through said wheel D far enough to receive a lock, nut, or other suitable device for holding pinion D in its place. Wheel D meshes in wheel C, mounted upon an adjustable arm, P, attached to the bracket B by means of a bolt or set-screw, $e$, passing through a slot in said arm, which admits the same to be moved to or from the gear-wheels D and R, and thus adjust the meshing of the three wheels D, R, and C. The cogs of wheel C are made to work in the cogs of the double wheel R, attached to the end of shaft X, which has its bearings in the rear end of frame C'. To the other end of shaft X I attach the wide-faced wheel V, with its cogs working in the cogs of wheel U, attached to the shaft of the upper feed-roller N. The cogs of wheel V also work in the cogs of wheel O, and those of O in the cogs of wheel U', attached to the lower feed-roller. Wheel O has its bearing on stud $f$, cast on the rear end of frame C'. The shaft of the lower feed-roller N has its bearings in the lower part of frame C'. The shaft of the upper feed-roller N works in the radial slots K K, which are constructed so that the said roller may be raised or lowered without detaching the cogs of wheel U from those of wheel V.

A horizontal frame is placed under the feed-box, constructed of two arms, L L, and bar $g$; or it may be constructed of one piece. The longer ends of arms L L are pivioned to the discharge-spout B' or to the frame A'. To the other ends of arms L L are pinioned the connecting-rods M M, the upper ends of which connect with the shaft of the upper feed-roller N, forming its bearings. By means of frame L L $g$ and the connecting-rods M M, the upper feed-roller is kept in a horizontal position while moving up and down, as the feed requires.

The double wheels D and R are constructed so that they can be easily and quickly removed, reversed, or interchanged. The object of reversing and interchanging the wheels D and R is to change the speed of the feed-rollers N, thus changing the length of the cut. By using one extra double wheel of different size, in combination with D and R, any length, from one-eighth of an inch to three inches, (say twenty-four lengths,) may be cut.

The spring T is placed under the feed-box, firmly bolted to the rear end of the bottom board and frame A', extending forward and bearing upon bar $g$, holding the upper feed-roller down on the material being cut.

The main or knife shaft Q is mounted upon and has its bearings in standards E' E', firmly bolted to the side pieces of frame I; or its bearings may be cast with frame I. Shaft Q carries a revolving spiral blade, F, which is mounted upon radial arms E E, attached to the main shaft Q, just inside of its bearings. Their outer ends are beveled, so that wedges G G may be inserted between them and the under side of the knife F, which is firmly attached to the arms E E by means of screw-bolts. The wedges G G are made concavo-convex to fit the under side of the knife, and rest on the arms E E, and are each provided with a slot, so as to allow free motion in adjusting the knife.

This feed-cutter may be made with two or more knives, if desired.

H represents the shearing-bar, and is made in two sections, bolted together. The upper part H is adjustable. The lower part is cast with frame I, or may be cast separately and bolted firmly to it. It has slotted holes passing vertically through it, so that the screw-bolts which hold down the upper or movable part H can move laterally.

The frame I is cast in one piece; or the sides may be cast separately and bolted to it. The main or knife shaft boxes E' E' may be cast separately, and bolted to the sides of frame I, as shown in Fig. 1; or they may be cast with the side pieces of said frame.

Each of the side pieces of frame C' has a round hole near the bottom, which form the bearings for the lower feed-roller, and radial slots K K, to receive the shaft of the upper feed-roller N.

In rear and just below the top of the adjustable shearing-bar H are set-screws J J, for the purpose of adjusting said bar to the knife F. On one end of the knife-shaft Q is mounted a gear-wheel, S, meshing in the main driving-wheel A, thus giving motion to the knife.

G' represents a cover, of cast metal or other suitable material, constructed to fit over the frame I, being attached thereto by means of lugs or ears K', pivoted to corresponding lugs L' on the frame. This cover is formed with suitable recesses on its lower edges, to fit over the boxes E' E' of the main or knife shaft.

A cover, of metal or other suitable material, is placed upon frame C', to cover the rollers. The sides of the feed-box approach each other toward the main frame C', falling inside of said frame, and are attached to it by means of screws from the outside.

I claim as my invention—

1. The slotted wedges G G, made concavo-convex, to fit the under side of the knife and the upper side of the radial arms, in combination with the radial arms E E and spiral knife F, substantially as and for the purposes set forth.

2. The bracket B, constructed with the outwardly-extending hollow arm b', which forms the bearing for the driving-wheel A, in combination with the short shaft D', substantially as described.

3. The reversible and interchangeable gear-wheels D and R, in combination with wheel C, mounted upon the adjustable arm P, substantially as described.

4. The horizontal frame L L and g, connecting-rods M M, feed-rollers N, and spring T, substantially as described.

WILLIAM H. HALL.

Witnesses:
J. S. BYERS,
H. C. KEPPEL.